(12) United States Patent
Billis et al.

(10) Patent No.: US 12,045,665 B2
(45) Date of Patent: Jul. 23, 2024

(54) SYSTEMS AND METHODS FOR MANAGING RESOURCE AVAILABILITY

(71) Applicant: JPMORGAN CHASE BANK, N.A., New York, NY (US)

(72) Inventors: Keith Billis, Franklin Lakes, NJ (US); Swati Karande, New York, NY (US); Martin Gilday, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 496 days.

(21) Appl. No.: 17/477,157

(22) Filed: Sep. 16, 2021

(65) Prior Publication Data

US 2022/0091901 A1 Mar. 24, 2022

Related U.S. Application Data

(60) Provisional application No. 63/080,322, filed on Sep. 18, 2020.

(51) Int. Cl.
*G06F 9/46* (2006.01)
*G06F 9/50* (2006.01)
*G06F 11/34* (2006.01)

(52) U.S. Cl.
CPC ........ *G06F 9/5077* (2013.01); *G06F 11/3495* (2013.01)

(58) Field of Classification Search
CPC .......................... G06F 9/5077; G06F 11/3495
See application file for complete search history.

Primary Examiner — Gregory A Kessler
(74) Attorney, Agent, or Firm — GREENBERG TRAURIG LLP

(57) ABSTRACT

Systems and methods for managing resource availability are disclosed. In one embodiment, a method for managing resource availability may include: (1) receiving, by a deployment computer program, an identification of a rack to build; (2) retrieving, by the deployment computer program, a plurality of application placement profiles for a plurality of applications; (3) selecting, by the deployment computer program, a subset of the applications to deploy to the rack, wherein the deployment computer program optimizes the selection based on metrics in the application placement profiles and a capacity of the rack; and (4) deploying, by the deployment computer program, the subset of applications to the rack.

20 Claims, 2 Drawing Sheets

SYSTEMS AND METHODS FOR MANAGING RESOURCE AVAILABILITY

RELATED APPLICATIONS

This application claims priority to, and the benefit of, U.S. Provisional Patent Application Ser. No. 63/080,322, filed Sep. 18, 2020, the disclosure of which is hereby incorporated, by reference, in its entirety.

BACKGROUND OF THE INVENTION

1. Field of the Invention

Embodiments are generally related to systems and methods for managing resource availability.

2. Description of the Related Art

Data centers are organized with computing devices (i.e., cores) and storage. With increasing demand, the requirements on the data centers are immense.

SUMMARY OF THE INVENTION

Systems and methods for managing resource availability are disclosed. In one embodiment, a method for managing resource availability may include: (1) receiving, by a deployment computer program, an identification of a rack to build; (2) retrieving, by the deployment computer program, a plurality of application placement profiles for a plurality of applications; (3) selecting, by the deployment computer program, a subset of the applications to deploy to the rack, wherein the deployment computer program optimizes the selection based on metrics in the application placement profiles and a capacity of the rack; and (4) deploying, by the deployment computer program, the subset of applications to the rack.

In one embodiment, the method may further include generating, by the deployment computer program, the application placement profile for each of the plurality of applications. The application placement profiles may include metrics for CPU usage, memory usage, storage usage, power consumption for each application.

In one embodiment, the metrics may be based on historical application data.

In one embodiment, the subset of application may be further selected based on clustering a plurality of hosts on the rack.

In one embodiment, the method may further include: monitoring, by a capacity monitoring computer program, operation of a rack; determining, by the capacity monitoring computer program, a rack utilization rate for resources in the rack; determining, by the capacity monitoring computer program, a rack consumption rate for the resources in the rack; receiving, by the capacity monitoring computer program, a rack supply rate; and ordering, by the capacity monitoring computer program, a second rack based on the rack utilization rate, the rack consumption rate, and the rack supply rate.

In one embodiment, the rack consumption rate may be predicted using a trained machine learning model.

In one embodiment, the method may further include redeploying, by the deployment computer program, a subset of the subset of applications to a third rack.

In one embodiment, the method may further include: monitoring, by a capacity monitoring computer program, operation of a rack; determining, by the capacity monitoring computer program, that the rack has a service event; generating, by the capacity monitoring computer program, a service ticket for the rack; removing, by the capacity monitoring computer program, the rack from deployment in response to an unresolved service ticket; and redeploying, by the deployment computer program, the subset of applications to a third rack.

According to another embodiment, an electronic device may include a memory storing a deployment computer program and a computer processor. When executed by the computer processor, the deployment computer program may cause the computer processor to: receive an identification of a rack to build; retrieve a plurality of application placement profiles for a plurality of applications; select a subset of the applications to deploy to the rack, wherein the deployment computer program optimizes the selection based on metrics in the application placement profiles and a capacity of the rack; and deploy the subset of applications to the rack.

In one embodiment, the deployment computer program may further cause the computer processor to: generate the application placement profile for each of the plurality of applications. The application placement profiles may include metrics for CPU usage, memory usage, storage usage, power consumption for each application.

In one embodiment, the metrics may be based on historical application data.

In one embodiment, the subset of application may be further selected based on clustering a plurality of hosts on the rack.

In one embodiment, the memory may also include a capacity monitoring computer program. When executed by the computer processor, the capacity monitoring computer program may cause the computer processor to: monitor operation of a rack; determine a rack utilization rate for resources in the rack; determine a rack consumption rate for the resources in the rack; receive a rack supply rate; and order a second rack based on the rack utilization rate, the rack consumption rate, and the rack supply rate.

In one embodiment, the rack consumption rate may be predicted using a trained machine learning model.

In one embodiment, the deployment computer program may further cause the computer processor to redeploy a subset of the subset of applications to a third rack.

In one embodiment, the capacity monitoring computer program may further cause the computer processor to: monitor operation of a rack; determine that the rack has a service event; generate a service ticket for the rack; and remove the rack from deployment in response to an unresolved service ticket. The deployment computer program may further cause the computer processor to redeploy the subset of applications to a third rack.

According to another embodiment, a system may include an application placement profile database comprising an application placement profile for each of a plurality of applications; an electronic device, comprising a memory storing a deployment computer program and a computer processor. When executed by the computer processor, the deployment computer program causes the computer processor to receive an identification of a rack to build; retrieve the plurality of application placement profiles from the application placement profile; select a subset of the applications to deploy to the rack, wherein the deployment computer program optimizes the selection based on metrics in the application placement profiles and a capacity of the rack; and deploy the subset of applications to the rack.

In one embodiment, the deployment computer program may further cause the computer processor to generate the application placement profile for each of the plurality of applications, wherein the application placement profiles comprise metrics for CPU usage, memory usage, storage usage, power consumption for each application.

In one embodiment, the memory may also include a capacity monitoring computer program, and, when executed by the computer processor, the capacity monitoring computer program may cause the computer processor to: monitor operation of a rack; determine a rack utilization rate for resources in the rack; determine a rack consumption rate for the resources in the rack; receive a rack supply rate; and order a second rack based on the rack utilization rate, the rack consumption rate, and the rack supply rate.

In one embodiment, the capacity monitoring computer program may further cause the computer processor to: monitor operation of a rack; determine that the rack has a service event; generate a service ticket for the rack; and remove the rack from deployment in response to an unresolved service ticket, and the deployment computer program further causes the computer processor to redeploy the subset of applications to a third rack.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
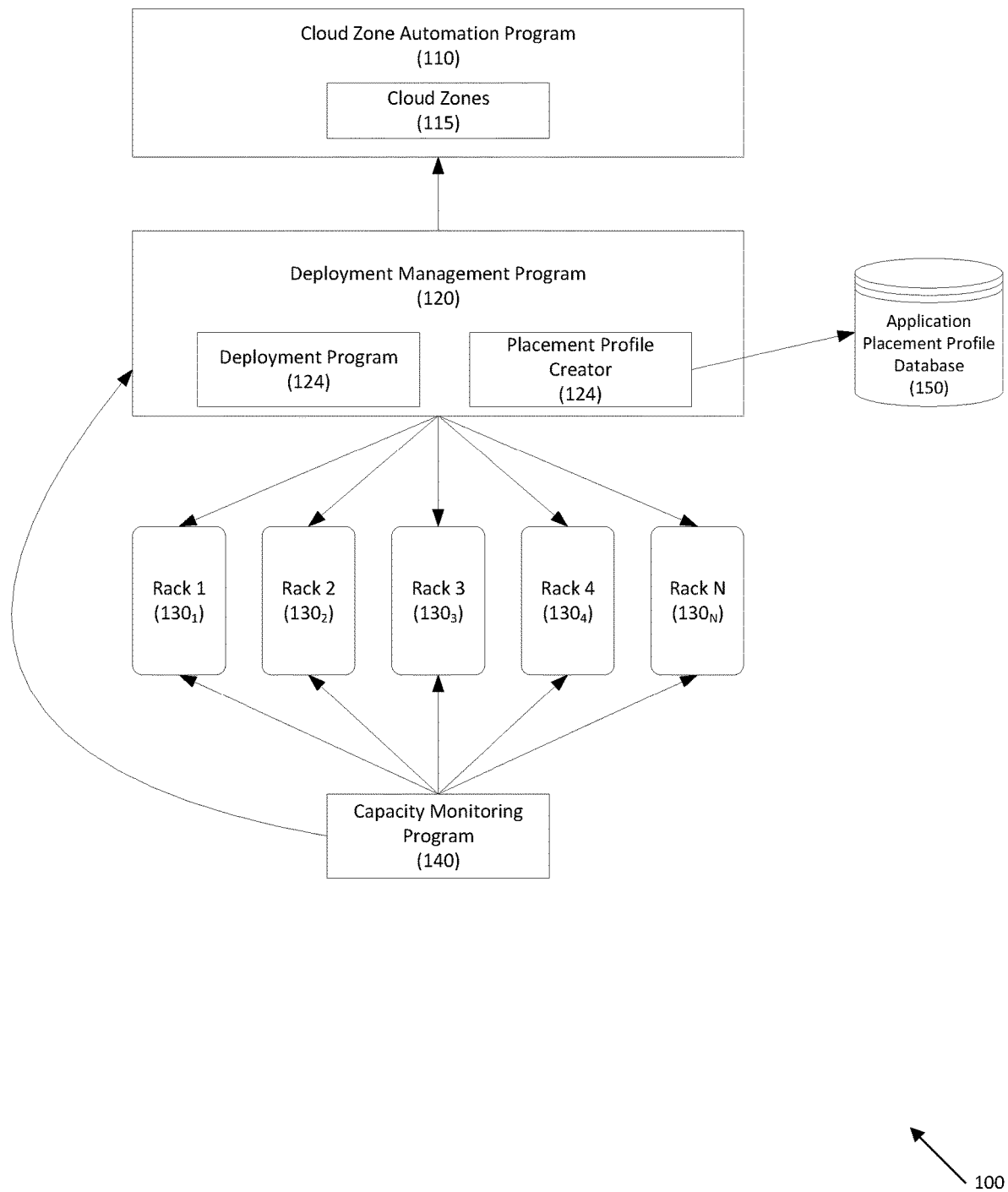
FIG. 1 depicts a system for managing resource availability according to one embodiment.

Embodiments relate generally to systems and methods for managing resource availability.

Embodiments assume that racks of compute power and storage are fungible. For example, racks may have a common pattern for compute. Hosts may also be organized in clusters and may use hypervisors, which abstracts the hardware layer and provides a core layer of fungibility. Further, virtual machines ("VMs") may be used which provide the final abstraction layer, which allows a workload to be run on any of the racks running hypervisors.

Embodiments may provide "unlimited" resource availability to consumers of a compute and storage platform. For example, triggers to re-order racks as necessary may be used. Rack builds may be automated using deployment patterns. "Failed" hosts may be continuously rebuilt and redeployed when possible. And the deployment of applications to the racks may be aligned with placement profiles for the applications.

In one embodiment, each application may be evaluated and associated with an application placement profile. The application placement profile may be generated by leveraging metrics and metadata from the environment. The application placement profile may include, for example, metrics for CPU usage, memory usage, storage usage, power consumption, etc. Other metrics or parameters may be used as is necessary and/or desired.

The metrics in the application placement profile may be presented a number, (e.g., 1-3, 1-10, 1-100, etc.), letter (A-F), quantitative (e.g., low-medium-high), etc.

In one embodiment, the application placement profiles may be reevaluated periodically, when the application is updated, etc.

Embodiments may use triggers to re-order racks. For example, embodiments may determine when the platform's capacity is low by checking utilization across racks and raise an event to order additional capacity. For example, when capacity falls below a certain amount (e.g., a percent of total capacity, a fixed number, etc.), additional rack(s) may be automatically ordered. Based on the deployment pattern, additional capacity for the management plane may be required, which may factor into to the available capacity determination.

The logic for re-ordering may include rack utilization, consumption rate, and supply rate. For example, consumption rate is the rate at which the resources in the racks being consumed. For example, if 50% of the resources are used, and users are taking 10% of the available resources per day, a re-ordering point can be predicted.

The supply rate is the based on how long it takes for racks to be delivered. For example, if there is a supply issue, such as a chip shortage, racks may be ordered earlier than normal.

In embodiment, as new racks and/or repaired racks arrive and are powered-on, a deployment management program may prepare them for the automatic build process to provide a build tool and the necessary metadata to bare-metal-build. The deployment management program may then receive notification the host(s) were built.

Each rack may include a plurality of hosts. For example, each rack may have 30 hosts deployed thereon. The deployment management program may wait until it receives a notification (e.g., success of failure) from each host in the rack before proceeding.

In one embodiment, management software, such as VMWare's Cloud Foundation ("vCF"), may be installed on each of the hosts. The vCF software may be used to build clusters of hosts, and virtual machines may be placed in the clusters.

In embodiments, the clusters may be organized in to "Cloud Zones" using, for example, a cloud zone automation program such as VMWare's vRealize Automation ("vRA"). Capacity may be presented to the consumer of the cloud zone automation program by associating it to a project. In embodiments, each project may have 1:1 relationship with an Application/Platform. Other ratios may be used as is necessary and/or desired.

The deployment management program may leverage a decision engine, such as a deployment program, to determine what capacity should align to what Cloud Zone/Project to group together applications based on their placement profiles to optimize density. Projects and Cloud Zones may be associated in any suitable manner. For example, for two Cloud Zones (e.g., CloudZones 1 and 2) and projects A, B, C, and D, CloudZone 1 may be associated to projects A and B, and CloudZone 2 may be associated to projects C and D. As other example, an application having a placement profile with a high core usage may be grouped with an application that has a placement profile that has a high memory usage.

When the automation is building the hosts into clusters, if anything fails, the hosts may be moved into a "recovery pool" and the process may continue with the operational hosts. A separate process attempts to diagnose and build the hosts from the "recovery pool." If the hosts cannot be rebuilt (e.g., after three attempts), hardware diagnostics may be run. If a failed component is found and replaceable, a ticket is created for replacement. If not, then a trigger to re-order a spare host may be created, and the host may be marked as "dead" and removed from the platform.

Embodiments may further leverage the placement profiles to handle market-shifting events that require emergency capacity. For example, when an event occurs or is suspected (e.g., an event that may require increased capacity), a tool, such as VMWare's vMotion, may move lower-utilized workloads together (temporarily) to allow the critical workloads that need temporary expansion room to grow. In embodiments, the deployment manager may leverage application profiles (e.g., is the application critical to market, production or non-production, CPU bound or memory bound, etc.) to leverage vMotion to relocate workloads that may be run overnight may be moved so that workloads that require the increased capacity may execute on those resources. For example, less important workloads may be moved to "tighter spaces" by dynamically changing the amount of compute resources that are available to that application (e.g., reduce the amount of resources to a non-critical application so that the resources can be allocated to a more a critical application.

Referring to FIG. 1, a system for managing resource availability is depicted according to an embodiment. System 100 may include cloud zone automation program 110, which may include cloud zones 115, deployment management program 120 that may include placement profile creator 124, and plurality of racks 130 (e.g., $130_1$, $130_2$, ... $103_N$). The usage of the plurality of racks may be monitored using capacity monitoring computer program 140.

Each rack 130 may include one or more electronic device (not shown) (e.g., servers) and each server may execute one or more computer program or application (not shown).

Deployment manager program 120 may manage the deployment of applications to racks 130. In one embodiment, deployment manager program 120 may include deployment computer program 122 and placement profile creator 124. Placement profile creator 124 may create an application placement profile for each application executed on each electronic device on each server 130. The placement profiles may include profiles for each application's CPU usage, memory usage, storage usage, power consumption, etc. The application placement profiles may be stored in one or more databases, such as application placement profile database 150.

Deployment computer program 122 may deploy applications to racks 130 based on the application placement profiles. In one embodiment, deployment computer program 122 may optimize the deployment of applications to racks 130 based on the metrics in their placement profiles, clustering, etc.

In embodiments, the deployment of applications may be selected to optimize available resources. The "shape" of the virtual machine—the CPU and memory allocation to each—may be used in this process. For example, if there is a VM that has 2 cores and 24 gb memory, and one that is 8 cores and 8 GB memory, the two may be deployed to a host that has a total of 10 cores and 32 GB memory.

Capacity monitoring program 140 may interface with racks 130 and may monitor the metrics of racks 130, the electronic devices on each rack, etc. For example, capacity monitoring computer program 140 may monitor racks 130 for issues (e.g., approaching rack capacity, rack is failed or failing, etc.), capacity monitoring computer program 140 may identify the rack for service or replacement, may order a new rack, etc.

In one embodiment, cloud zone automation program, deployment management program, and/or capacity monitoring computer program 140 may be executed on an electronic device (e.g., a server), in the cloud, combinations thereof, etc.

Figure 2:
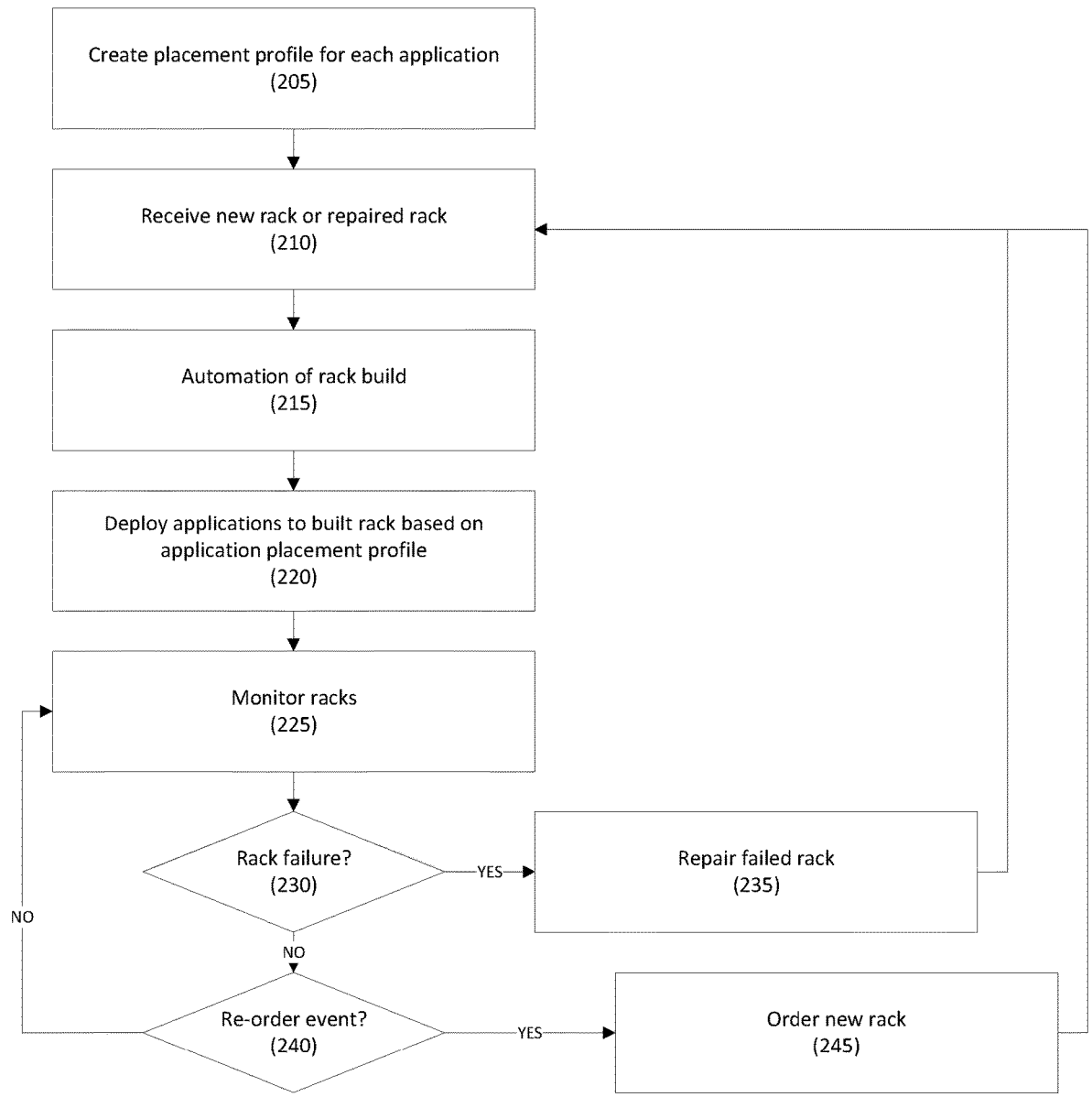
FIG. 2 illustrates a method for managing resource availability according to one embodiment.

Referring to FIG. 2, a method for managing resource availability is depicted according to an embodiment.

In step 205, a placement profile creator computer program may create an application placement profile for each application executed by each electronic device on one or more racks. For example, as discussed above, the application placement profile may identify metrics for CPU usage, memory usage, storage usage, power consumption, etc. The application placement profile may be based on the VM shapes that an application creates, such as CPU and memory usage. The most common shape and a ratio of CPU to memory may be used.

In one embodiment, the application placement profiles may be stored in an application placement profile database. The application placement profiles may be updated as is necessary and/or desired.

In step 210, a new or repaired rack may be received and, in step 215, an automated build process for the rack may be initiated. In one embodiment, the build process may be initiated by an automated event, such as a power on event, a network connection event, etc.

In step 220, a deployment computer program may deploy applications to the new or repaired rack based on, for example, the applications' placement profiles. In one embodiment, the deployment computer program may identify and optimize the applications for deployment to the rack. For example, the aggregated metrics from the application placement profiles for the applications to be deployed to the rack should be below the capacities for the rack.

In step 225, a capacity monitoring computer program may monitor the racks. For example, the racks may be monitored for issues, hardware failure, capacity usage, end of life, etc. Any suitable metric from the rack may be received and analyzed.

In one embodiment, machine learning and/or artificial intelligence may be used to predict issues.

In step 230, if the capacity monitoring computer program identifies a host as failed or failing, or with some other issue requiring attention or repair, in step 235, the capacity monitoring computer program may identify the host for repair or service, and repairs on the rack will be attempted. If, after a predetermined number of attempts (e.g., three), the rack cannot be repaired, the rack may be decommissioned.

In one embodiment, when a host fails, the VMware software automatically moves the VMs onto another host in the cluster. The capacity monitoring computer program may remove the failed host from the cluster and may leverage a spare node, if available, in the rack into the cluster. The spare node may be deployed as part of the deployment process. This restores capacity within a minimal time.

If the host can be repaired, it may re-enter the pool of deployable racks in step 210.

If the capacity of the racks is reaching a predetermined threshold, or additional rack(s) are needed to replace a failed/failing rack, in step 245, new rack(s) may be reordered. In one embodiment, the reordering process may be fully automated, including the request for any necessary approvals. In another embodiment, the reordering process may be manual. In still another embodiment, the process may be a combination of automated and manual.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for managing resource availability, comprising:
    receiving, by a deployment computer program, an identification of a rack to build;
    retrieving, by the deployment computer program, a plurality of application placement profiles for a plurality of applications;
    selecting, by the deployment computer program, a subset of the applications to deploy to the rack, wherein the deployment computer program optimizes the selection based on metrics in the application placement profiles and a capacity of the rack; and
    deploying, by the deployment computer program, the subset of applications to the rack.

2. The method of claim 1, further comprising:
    generating, by the deployment computer program, the application placement profile for each of the plurality of applications;
    wherein the application placement profiles comprise metrics for CPU usage, memory usage, storage usage, power consumption for each application.

3. The method of claim 1, wherein the metrics are based on historical application data.

4. The method of claim 1, wherein the subset of application is further selected based on clustering a plurality of hosts on the rack.

5. The method of claim 1, further comprising:
    monitoring, by a capacity monitoring computer program, operation of a rack;
    determining, by the capacity monitoring computer program, a rack utilization rate for resources in the rack;
    determining, by the capacity monitoring computer program, a rack consumption rate for the resources in the rack;
    receiving, by the capacity monitoring computer program, a rack supply rate; and
    ordering, by the capacity monitoring computer program, a second rack based on the rack utilization rate, the rack consumption rate, and the rack supply rate.

6. The method of claim 5, wherein the rack consumption rate is predicted using a trained machine learning model.

7. The method of claim 5, further comprising:
    redeploying, by the deployment computer program, a subset of the subset of applications to a third rack.

8. The method of claim 1, further comprising:
    monitoring, by a capacity monitoring computer program, operation of a rack;
    determining, by the capacity monitoring computer program, that the rack has a service event;
    generating, by the capacity monitoring computer program, a service ticket for the rack;
    removing, by the capacity monitoring computer program, the rack from deployment in response to an unresolved service ticket; and
    redeploying, by the deployment computer program, the subset of applications to a third rack.

9. An electronic device, comprising:
    a memory storing a deployment computer program;
    a computer processor;

wherein, when executed by the computer processor, the deployment computer program causes the computer processor to:
  receive an identification of a rack to build;
  retrieve a plurality of application placement profiles for a plurality of applications;
  select a subset of the applications to deploy to the rack, wherein the deployment computer program optimizes the selection based on metrics in the application placement profiles and a capacity of the rack; and
  deploy the subset of applications to the rack.

10. The electronic device of claim 9, wherein the deployment computer program further causes the computer processor to:
  generate the application placement profile for each of the plurality of applications;
  wherein the application placement profiles comprise metrics for CPU usage, memory usage, storage usage, power consumption for each application.

11. The electronic device of claim 9, wherein the metrics are based on historical application data.

12. The electronic device of claim 9, wherein the subset of application is further selected based on clustering a plurality of hosts on the rack.

13. The electronic device of claim 9, wherein the memory further comprises a capacity monitoring computer program, and, when executed by the computer processor, the capacity monitoring computer program causes the computer processor to:
  monitor operation of a rack;
  determine a rack utilization rate for resources in the rack;
  determine a rack consumption rate for the resources in the rack;
  receive a rack supply rate; and
  order a second rack based on the rack utilization rate, the rack consumption rate, and the rack supply rate.

14. The electronic device of claim 13, wherein the rack consumption rate is predicted using a trained machine learning model.

15. The electronic device of claim 13, wherein the deployment computer program further causes the computer processor to:
  redeploy a subset of the subset of applications to a third rack.

16. The electronic device of claim 13, wherein the capacity monitoring computer program further causes the computer processor to:
  monitor operation of a rack;
  determine that the rack has a service event;
  generate a service ticket for the rack; and
  remove the rack from deployment in response to an unresolved service ticket;
  wherein the deployment computer program further causes the computer processor to:
  redeploy the subset of applications to a third rack.

17. A system comprising:
  an application placement profile database comprising an application placement profile for each of a plurality of applications;
  an electronic device, comprising:
  a memory storing a deployment computer program; and
  a computer processor;
  wherein, when executed by the computer processor, the deployment computer program causes the computer processor to receive an identification of a rack to build; retrieve the plurality of application placement profiles from the application placement profile; select a subset of the applications to deploy to the rack, wherein the deployment computer program optimizes the selection based on metrics in the application placement profiles and a capacity of the rack; and deploy the subset of applications to the rack.

18. The system of claim 17, wherein the deployment computer program further causes the computer processor to generate the application placement profile for each of the plurality of applications, wherein the application placement profiles comprise metrics for CPU usage, memory usage, storage usage, power consumption for each application.

19. The system of claim 17, wherein the memory further comprises a capacity monitoring computer program, and, when executed by the computer processor, the capacity monitoring computer program causes the computer processor to: monitor operation of a rack; determine a rack utilization rate for resources in the rack; determine a rack consumption rate for the resources in the rack; receive a rack supply rate; and order a second rack based on the rack utilization rate, the rack consumption rate, and the rack supply rate.

20. The system of claim 19, wherein the capacity monitoring computer program further causes the computer processor to: monitor operation of a rack; determine that the rack has a service event; generate a service ticket for the rack; and remove the rack from deployment in response to an unresolved service ticket, and the deployment computer program further causes the computer processor to redeploy the subset of applications to a third rack.

* * * * *